(12) United States Patent
Qu

(10) Patent No.: US 12,335,101 B2
(45) Date of Patent: Jun. 17, 2025

(54) INFORMATION PROCESSING METHOD BASED ON INTERNET OF THINGS DEVICE, RELATED DEVICE AND STORAGE MEDIUM

(71) Applicants: China Mobile Communication Co., Ltd Research Institute, Beijing (CN); China Mobile Communications Group Co., Ltd., Beijing (CN)

(72) Inventor: Wei Qu, Beijing (CN)

(73) Assignees: China Mobile Communication Co., Ltd Research Institute, Beijing (CN); China Mobile Communications Group Co., Ltd., Beijing (CN)

(*) Notice: Subject to any disclaimer, the term of this patent is extended or adjusted under 35 U.S.C. 154(b) by 12 days.

(21) Appl. No.: 18/263,023

(22) PCT Filed: Feb. 8, 2022

(86) PCT No.: PCT/CN2022/075517
§ 371 (c)(1),
(2) Date: Jul. 26, 2023

(87) PCT Pub. No.: WO2022/171083
PCT Pub. Date: Aug. 18, 2022

(65) Prior Publication Data
US 2024/0097985 A1   Mar. 21, 2024

(30) Foreign Application Priority Data
Feb. 10, 2021 (CN) .................. 202110184830.4

(51) Int. Cl.
*G06F 15/173* (2006.01)
*G16Y 10/75* (2020.01)
(Continued)

(52) U.S. Cl.
CPC .............. *H04L 41/12* (2013.01); *G16Y 10/75* (2020.01); *G16Y 20/30* (2020.01); *G16Y 40/35* (2020.01)

(58) Field of Classification Search
CPC ..... H04L 41/12; H04L 67/1061; H04L 45/02; H04L 47/70; H04L 63/10; H04L 67/1042;
(Continued)

(56) References Cited

U.S. PATENT DOCUMENTS 10,601,640 B1 *  3/2020  Das ..................... H04L 41/0636
10,679,133 B1 *  6/2020  Mathur ..................... G06N 5/02
(Continued)

FOREIGN PATENT DOCUMENTS

CN   107888644 A   4/2018
CN   108021718 A   5/2018
(Continued)

OTHER PUBLICATIONS

Qu et al, "ICTA: Intelligent Computing Task Allocation for Efficient Deep Learning in Distributed Edge Computing System of IoT", BDSIC 2020, Dec. 3-5, 2020, Xiamen, China.
(Continued)

*Primary Examiner* — Dustin Nguyen
*Assistant Examiner* — Hao H Nguyen
(74) *Attorney, Agent, or Firm* — Price Heneveld LLP

(57) ABSTRACT

An information processing method based on an IoT device, an information processing apparatus based on an IoT device, an information processing system based on an IoT device, an electronic device, and a storage medium are provided, where the method includes: discovering the IoT device; and detecting a capability of the IoT device; abstracting, for each IoT device, the IoT device into a corresponding node based on the capability of corresponding IoT device; generating, based on the abstracted node, a resource knowledge graph,
(Continued)

where the node represents at least part of the capabilities of one IoT device; an edge in the resource knowledge graph represents a relationship between two adjacent nodes; and the resource knowledge graph is configured to manage and/or orchestrate the available capability on a heterogeneous IoT device.

11 Claims, 6 Drawing Sheets

(51) Int. Cl.
  *G16Y 20/30* (2020.01)
  *G16Y 40/35* (2020.01)
  *H04L 41/12* (2022.01)
(58) Field of Classification Search
  CPC ........ G16Y 40/35; G16Y 10/75; G16Y 20/30; G16Y 40/10; G16Y 40/30
  See application file for complete search history.

(56) References Cited

U.S. PATENT DOCUMENTS

| | | | |
|---|---|---|---|
| 11,874,885 B2* | 1/2024 | Jeong | G06N 5/022 |
| 2016/0203234 A1* | 7/2016 | Piccand | H04W 4/70 707/798 |
| 2016/0366181 A1* | 12/2016 | Smith | G06F 21/6236 |
| 2017/0006116 A1* | 1/2017 | Kelly | H04L 41/5054 |
| 2018/0027060 A1* | 1/2018 | Metsch | G06F 16/1748 |
| 2018/0102916 A1* | 4/2018 | Chen | H04L 67/63 |
| 2018/0275978 A1* | 9/2018 | Yang | G06F 8/60 |
| 2019/0041830 A1* | 2/2019 | Yarvis | G05B 19/042 |
| 2019/0138318 A1* | 5/2019 | Yang | G06F 9/448 |
| 2019/0190802 A1* | 6/2019 | Jalali | H04L 67/104 |
| 2019/0286109 A1* | 9/2019 | Zillner | G05B 23/0251 |
| 2019/0287006 A1* | 9/2019 | Costabello | G06N 5/045 |
| 2020/0153697 A1* | 5/2020 | Turner | H04L 41/12 |
| 2020/0327426 A1* | 10/2020 | Li | G06N 5/022 |
| 2021/0014300 A1* | 1/2021 | Zhu | H04L 43/0817 |
| 2021/0027197 A1* | 1/2021 | Foerster | G06N 3/105 |
| 2021/0048787 A1* | 2/2021 | Mirabella | G06N 5/022 |
| 2021/0117402 A1* | 4/2021 | Lee | G06F 16/23 |
| 2021/0306831 A1* | 9/2021 | Seed | H04L 41/5041 |
| 2022/0030066 A1* | 1/2022 | Govindaraju | H04L 67/12 |
| 2022/0092443 A1* | 3/2022 | Seyot | G06F 40/295 |
| 2022/0095079 A1* | 3/2022 | Volkerink | H04W 4/80 |
| 2022/0121966 A1* | 4/2022 | Wu | G06F 16/36 |
| 2022/0166848 A1* | 5/2022 | Banerjee | H04L 67/568 |
| 2022/0210201 A1* | 6/2022 | Kastroulis | H04L 63/10 |

FOREIGN PATENT DOCUMENTS

| | | | | |
|---|---|---|---|---|
| CN | 108156260 A | | 6/2018 | |
| CN | 109165296 A | | 1/2019 | |
| CN | 109189943 A | | 1/2019 | |
| CN | 109446385 A | | 3/2019 | |
| CN | 109840270 A | | 6/2019 | |
| CN | 111641621 A | * | 9/2020 | ......... H04L 63/1416 |

OTHER PUBLICATIONS

China Mobile (China), "Proposal on initiating a new work item on Y.IDML-arc" "Reference architecture of intelligent decentralized machine learning based on IoT device collaboration for smart home", International Telecommunication Union: Telecommunication Standardization Sector, Study Period 2017-2020, Q4-20-C-74 (Feb. 2011), Study Group 20, Virtual, Nov. 2-5, 2020.

* cited by examiner

Ontology Description Model

INFORMATION PROCESSING METHOD BASED ON INTERNET OF THINGS DEVICE, RELATED DEVICE AND STORAGE MEDIUM

CROSS REFERENCE OF RELATED APPLICATION

This application is a U.S. national phase application of a PCT Application No. PCT/CN2022/075517 filed on Feb. 8, 2022, which claims a priority of Chinese patent application No. 202110184830.4 filed on Feb. 10, 2021, the disclosure of which is incorporated herein by reference in its entirety.

TECHNICAL FIELD

The present application relates to the field of the Internet of Things (IoT, Internet of Things), and in particular, relates to an information processing method based on the IoT device, an information processing apparatus based on the IoT device, an information processing system based on the IoT device, an electronic device, and a storage medium.

BACKGROUND

Edge computing, as a computing method for performing data processing at a network edge side, has received more and more attention in recent years, especially in the field of Internet of Things, the edge computing becomes a new research hotspot after cloud computing. Compared with the cloud computing, the edge computing does not need to transmit a large amount of user original data to a cloud data center. Therefore, the edge computing solves the problems of delay, reliability, energy consumption, communication bandwidth consumption, user privacy, security, etc. in the data processing process, the edge computing has a greater value and a wide application prospect in AI (AI, Artificial Intelligence)-based application scenarios (such as smart home scenarios) that are more sensitive (that is, has higher requirements) to the requirements such as a data processing delay and user privacy.

However, intelligent applications and/or services for implementing AI-based application scenarios usually need to perform computing-intensive computing tasks that require higher computing capability and/or storage space, which brings a big challenge to the resource-constrained (that is, limited computing capability and/or storage space) and highly heterogeneous edge side, that is, how to make full use of resource-constrained and highly heterogeneous IoT device to perform computing tasks becomes an urgent problem to be solved.

SUMMARY

In order to solve related technical problems, embodiments of the present application provide an information processing method based on the IoT device, an information processing apparatus based on the IoT device, an information processing system based on the IoT device, an electronic device, and a storage medium.

The technical solutions of the embodiments in the present application are realized in this way.

An embodiment of the present application provides an information processing method based on an Internet of Things (IoT) device, which includes:
discovering the IoT device; and detecting a capability of the IoT device;
abstracting, for each IoT device, the IoT device into a corresponding node based on the capability of the each IoT device;
generating, based on the abstracted node, a resource knowledge graph, where the node represents at least part of the capabilities of one IoT device; an edge in the resource knowledge graph represents relationship between two adjacent nodes; and the resource knowledge graph is configured to manage and/or orchestrate the available capabilities on a heterogeneous IoT device.

In some optional embodiments of the present disclosure, the available capabilities include at least one of the following:
a computing capability;
a storage capability;
a communication capability.

In some optional embodiments of the present disclosure, the generating, based on the abstracted node, a resource knowledge graph includes:
determining a characteristic of each node, and determining relationship among a plurality of nodes; where the characteristic is at least configured to describe IoT device information corresponding to the corresponding node and at least part of the capability information of the IoT device;
generating, based on the determined characteristic and the relationship among nodes, the resource knowledge graph.

In some optional embodiments of the present disclosure, the edge in the resource knowledge graph represents at least one of the following:
communication relationship between two IoT devices;
relationship between at least part of the capabilities on the IoT device.

In some optional embodiments of the present disclosure, the method further includes:
monitoring the IoT device;
updating, in a case that a change occurred in the IoT device is monitored, the resource knowledge graph based on the condition of the monitored change of the IoT device.

In some optional embodiments of the present disclosure, the monitored change of the IoT device includes at least one of the following:
discovering a new IoT device;
monitoring that the IoT device is disconnected from a network connection;
monitoring a change in a computing capability of the IoT device;
monitoring a change in a storage capability of the IoT device;
monitoring a change in a relationship between IoT devices;
monitoring a change in the relationship between at least part of the capabilities on the IoT device.

In some optional embodiments of the present disclosure, the method further includes:
obtaining a task to be processed;
assigning, based on the resource knowledge graph, at least one node to the task to be processed, where the at least one node is configured to execute the task to be processed.

In some optional embodiments of the present disclosure, the assigning, based on the resource knowledge graph, at least one node to the task to be processed includes:

determining resource requirement of the task to be processed; determining at least one node matched with the resource requirement from the resource knowledge graph, where the resource requirement represents at least one of the following resources that need to be occupied to execute the task to be processed:
a computing resource;
a storage resource;
a communication resource.

In some optional embodiments of the present disclosure, the determining at least one node matched with the resource requirement from the resource knowledge graph includes:
performing search directed to the resource requirement based on the characteristic of each node in the resource knowledge graph and the relationship among nodes;
determining, based on the search result, at least one node matched with the resource requirement.

An embodiment of the present application also provides an information processing apparatus based on an Internet of Things (IoT) device, which includes:
a detecting unit, configured to discover IoT devices; and detect capabilities of the IoT devices;
a first processing unit, configured to abstract, for each IoT device, the IoT device into a corresponding node based on the capabilities of corresponding IoT device;
a second processing unit, configured to generate, based on the abstracted node, a resource knowledge graph, where the node represents at least part of the capabilities of one IoT device; an edge in the resource knowledge graph represents a relationship between two adjacent nodes; and the resource knowledge graph is configured to manage and/or orchestrate the available capabilities on a heterogeneous IoT device.

An embodiment of the present application also provides an information processing system based on an Internet of Things (IoT) device, which includes:
a first functional component, configured to discover the IoT devices; and detect capabilities of the IoT devices;
a second functional component, configured to abstract, for each IoT device, the IoT device into a corresponding node based on the capabilities of corresponding IoT device; and generate, based on the abstracted node, a resource knowledge graph, where the first functional component and the second functional component are arranged on two electronic devices.

An embodiment of the present application also provides an electronic device, which includes: a processor and a memory configured to store a computer program capable of running on the processor,
where the processor is configured to execute the steps of the above-mentioned any method when running the computer program.

An embodiment of the present application also provides a storage medium, on which a computer program is stored, and when the computer program is executed by a processor, the steps of the above-mentioned any method are implemented.

An information processing method based on the IoT device, an information processing apparatus based on the IoT device, an information processing system based on the IoT device, an electronic device, and a storage medium are provided by the embodiments of the present application, the method includes: discovering the IoT device; and detecting a capability of the IoT device; abstracting, for each IoT device, the IoT device into a corresponding node based on the capability of corresponding IoT device; generating, based on the abstracted node, a resource knowledge graph, where the node represents at least part of the capabilities of one IoT device; an edge in the resource knowledge graph represents a relationship between two adjacent nodes; and the resource knowledge graph is configured to manage and/or orchestrate the available capabilities on a heterogeneous IoT device. The solutions of the embodiments of the present application include: performing the intelligent perception of the IoT device and its capabilities (that is, idle resources of IoT device), and abstracting, through virtualization and software-definition technologies, the IoT device into the corresponding node based on the perceived capabilities, and generating a resource knowledge graph based on the abstracted nodes, where the generated resource knowledge graph can be used to manage and/or orchestrate the available capabilities on the heterogeneous IoT device, so that resource-constrained and highly heterogeneous IoT devices can be efficiently managed and flexibly scheduled based on the resource knowledge graph, which provides a prerequisite for the realization of edge computing in AI-based application scenarios (that is, the realization of computing-intensive computing tasks), so that the user do not need to transmit data related to personal privacy to the cloud data center, thereby enhancing privacy protection, reducing a transmission delay, and improving user experience.

DETAILED DESCRIPTION

The application will be further described in detail below in conjunction with the drawings and embodiments.

With rapid growth of a quantity and an intelligent level of IoT devices, in order to make full use of resource-constrained and highly heterogeneous IoT devices, it is possible to consider utilizing widely distributed idle resources on the IoT devices to execute computing-intensive computing tasks in parallel in a distributed manner through resource sharing and device cooperation. In practical applications, realizing intelligent perception and unified management of heterogeneous IoT device resources is a prerequisite for making full use of heterogeneous IoT devices.

Based on this, in various embodiments of the present application, intelligent perception is performed on the IoT devices and capabilities (that is, idle resources of IoT devices) of the IoT devices, and the IoT devices are abstracted into the corresponding nodes through virtualization and software-definition technologies based on the perceived capabilities, and a resource knowledge graph is generated based on the abstracted nodes, where the generated resource knowledge graph can be used to manage and/or orchestrate available capabilities on the heterogeneous IoT devices, so that resource-constrained and highly heterogeneous IoT devices can be efficiently managed and flexibly scheduled based on the resource knowledge graph, which provides a prerequisite for realization of the edge computing in an AI-based application scenarios (that is, the realization of computing-intensive computing tasks), so that the user does not need to transmit data related to personal privacy to the cloud data center, thereby enhancing privacy protection, reducing a transmission delay, and improving a user experience.

Figure 1:
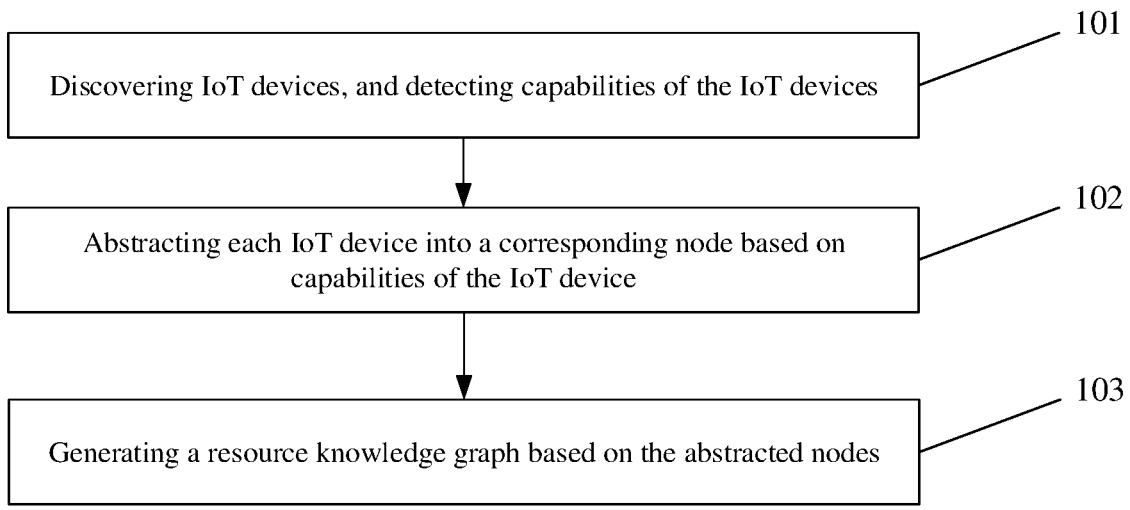
FIG. 1 is a flowchart of an information processing method in an embodiment of the present application.

An embodiment of the present application provides an information processing method based on Internet of Things (IoT) devices, as shown in FIG. 1, the method includes:
- step 101: discovering IoT devices; and detecting capabilities of the IoT devices;
- step 102: abstracting, for each of the IoT devices, the IoT devices into corresponding nodes based on the capability of the corresponding IoT device;
- step 103: generating, based on the abstracted node, a resource knowledge graph (also called a resource graph or resource knowledge graph).

Here, the node represents at least part of the capabilities of one IoT device; an edge in the resource knowledge graph represents a relationship (also called as the association relationship (expressed as Association Relationship) between two adjacent nodes) between two adjacent nodes; the relationship may include a communication relationship and a subordinate relationship, and the communication relationship may include information that can represent a communication strength, such as an information transmission rate and a transmission delay between two adjacent nodes; and the resource knowledge graph is configured to manage and/or orchestrate an available capability on a heterogeneous IoT device.

In practical applications, the IoT device in this embodiment of the present application may be a heterogeneous IoT device. Here, the heterogeneous IoT device means: in a network including multiple IoT devices and servers, the hardware of one IoT device is different from the hardware of another IoT device, and/or, the server of one IoT device is different from the server of another IoT device, where the difference between the hardware of one IoT device and the hardware of another IoT device means that: the models of a central processing unit (CPU, Central Processing Unit), a graphics processing unit (GPU, Graphics Processing Unit), a bus interface chip (BIC, Bus Interface Chip), a digital signal processor (DSP, Digital Signal Processor) and other processing hardware or a random access memory (RAM, Random Access Memory), a read only memory (ROM, Read Only Memory) and other storage hardware of one IoT device are different from the models of the hardware of another IoT device; the difference between the server of one IoT device and the server of the other IoT device means that: the backend program corresponding to one IoT device is different from the backend program corresponding to another IoT device, or the operating system of one IoT device is different from the operating system of another IoT device, in other words, there are differences at the software level between two IoT devices.

In actual applications, the IoT devices may include a mobile phone, a personal computer (PC, Personal Computer), a wearable smart device, an intelligent gateway, a computing box, etc.; the PC may include a desktop computer, a notebook computer, a tablet computer, etc.; the wearable smart device may include a smart watch, a smart glass, and the like.

In actual applications, the information processing method of the embodiment of the present application may be applied to electronic device, such as a server.

In step 101, in actual application, the discovering the IoT devices may also be referred to as perceiving the IoT devices in an edge network; the edge network refers to the edge of the telecommunications network (the edge network includes part or all of the convergence layer network and the access layer network, and is the last part for accessing users by a network), where the discovering or perceiving may also be understood as detecting, for example, an electronic device (specifically, may be a server) may be based on a dynamic host configuration protocol (DHCP, Dynamic Host Configuration Protocol) and utilize the zero configuration networking (ZEROCONF, ZERO CONConfiguration networking) technology to detect the IoT devices in the edge network. Of course, the electronic device may also be set to discover or perceive the IoT devices in other ways according to the requirement, which is not limited in this embodiment of the present application.

After discovering the IoT devices, the electronic device may detect the capability of the corresponding IoT device by performing information interaction with the corresponding IoT device; for example, the electronic device may send a capability request message to the corresponding IoT device, and determine the capability of the corresponding IoT device according to the message replied by the corresponding IoT device to the capability request message.

Here, the capability of the IoT device may include at least one of the following: computing capability, and storage capability, where the capability of the IoT device refers to the service capability of the IoT device, which may be understood as the resource of the corresponding IoT device; correspondingly, at least part of the capability of one IoT device may be understood as at least part of the resources of one IoT device, the available capability on one IoT device may be understood as available resources on one IoT device, i.e., idle resources (also referred to as idle capability, unused capability, vacant capability, unused resources, or vacant resources); that is, the computing capability refers to the computing resources available to the corresponding IoT device; the storage capability refers to the storage resource (i.e. the storage space) available to the corresponding IoT device.

In addition, communication between nodes is required to reflect the communication relationship among nodes.

Based on this, in the resource knowledge graph, the available capability on heterogeneous IoT devices may include at least one of the following: computing capability, storage capability, communication capability, where the communication capability may be understood as the communication strength between two nodes, for example, the bandwidth resource, an information transmission speed (i.e. a transmission rate), a transmission delay, etc. provided by the edge network for communication between IoT devices; as another example, the transmission rate, the transmission delay, etc. between one part of the capabilities and another part of the capabilities of one IoT device.

In step 102, a software-definition technology is used to abstract a physical IoT device into a virtualized node, and the node may include capability information of a corresponding IoT device. Different nodes may be abstracted according to the different capabilities of IoT devices; specifically, Based on the computing capability and the storage capability of the corresponding IoT device, the physical IoT device may be abstracted into a virtualized device node; the device node may include computing capability information and storage capability information of the corresponding IoT device; that is, the device node can represent the computing capability and the storage capability of the corresponding IoT device.

Based on the computing capability of the corresponding IoT device, the physical IoT device may be abstracted into a fine-grained, virtualized computing node; the computing node may include the computing capability information of the corresponding IoT device; that is, the computing node can represent the computing capability of the corresponding IoT device.

Based on the storage capability of the corresponding IoT device, the physical IoT device may be abstracted into a fine-grained, virtualized storage node; the storage node may include the storage capability information of the corresponding IoT device; that is, the storage node can represent the storage capability of the corresponding IoT device.

It can be seen that in step 102, according to the represented different capabilities of the corresponding IoT device, the types of abstracted nodes may include: a device node, a computing node and a storage node. In practical applications, for one IoT device, the abstracted nodes may include: at least one of a device node, a computing node, and a storage node.

Correspondingly, the relationship between two nodes may include at least one of the following:
a communication relationship between one device node and another device node, which represents the communication strength between one IoT device and another IoT device;
a subordinate relationship between a device node and a computing node, which represents a subordinate relationship between one IoT device and at least part of its own computing capabilities;
a subordinate relationship between a device node and a storage node, which represents a subordinate relationship between one IoT device and at least part of its own storage capabilities;
a communication relationship between a computing node and a storage node, which represents the communication strength between at least part of the computing capabilities and at least part of the storage capabilities of the same IoT device, or, the communication strength between at least part of the computing capabilities of one IoT device and at least part of storage capabilities of another IoT device;
a communication relationship between a computing node and another computing node, which represents the communication strength between at least part of the computing capabilities of the same IoT device, or, the communication strength between at least part of the computing capabilities of one IoT device and at least part of the computing capabilities of another IoT device;
a communication relationship between a storage node and another storage node, which represents the communication strength between at least part of the storage capabilities of the same IoT device, or, the communication strength between at least part of the storage capabilities of one IoT device and at least part of the storage capabilities of another IoT device.

For step 103, in an embodiment, the generating, based on the abstracted nodes, a resource knowledge graph may include:
determining a characteristic of each node, and determining relationship among a plurality of nodes; where the characteristic is at least configured to describe corresponding IoT device information of the corresponding node and at least part of capability information of the IoT device;
generating, based on the determined characteristic and the relationship among nodes, the resource knowledge graph.

Here, in actual application, the number of the characteristic of the node may be multiple, therefore, the characteristic may also be called a characteristic vector, a characteristic set or a characteristic group; because the characteristic includes a plurality of description information (that is, the IoT device information corresponding to the corresponding node and at least part of the capability information of the IoT device), therefore, the characteristic may also be referred to as information, information set or information collection. In practical applications, the characteristic of node can be used for representation of an ontology description model (Ontology Description Model), the ontology description model may also be called an entity description model.

The IoT device information corresponding to the corresponding node may include: a device identity (ID), a device type, a device location, a device state, a device Internet Protocol (IP) address, a device function, a device owner, a device interface and other information; the device state may include: an on (On) state, an off (Off) state and an abnormal (Fault) state. At least part of the capability information of the IoT device corresponding to the corresponding node may include: computing capability information of the corresponding IoT device and/or storage capability information of the corresponding IoT device; where the computing capability information may include available computing resource information such as CPU, GPU, Field-Programmable Gate Array (FPGA, Field-Programmable Gate Array), DSP; the storage capability information may include volatile memory (such as magnetic random access memory (FRAM, Ferromagnetic Random Access Memory)), non-volatile memory (such as RAM) and other available memory resource information.

In practical applications, for the abstracted nodes, after determining the characteristic of each node, it is necessary to connect the nodes with relationships, that is, to determine the edge between two nodes, so as to generate a resource knowledge graph.

Here, the edges in the resource knowledge graph may represent at least one of the following:
a communication relationship between two IoT devices;
a relationship between at least part of the capabilities on the IoT device, where the communication relationship between two IoT devices can be understood as the communication strength between two IoT devices, which is used to describe communication conditions such as a bandwidth, an information transmission speed, and a transmission delay between two IoT devices. The information transmission speed may also be referred to as an information transmission rate.

The relationship between at least part of capabilities on the IoT device may include at least one of the following:
  a communication relationship between at least part of the capabilities on one IoT device and other capabilities of the same IoT device;
  a communication relationship between at least part of the capabilities on one IoT device and at least part of the capabilities on another IoT device;
  a subordinate relationship between all capabilities on one IoT device and part of capabilities of the same IoT device.

Specifically, if it is perceived (that is, detected) that wired communication or wireless communication can be performed between two IoT devices, the electronic device can determine that there is a communication relationship between the two IoT devices, that is, there is a relationship between the corresponding two device nodes.

If it is perceived (i.e., detected) that wired communication or wireless communication exists between a first processor of a first IoT device and a first memory of a second IoT device, the electronic device may determine that there is a communication relationship between the first processor and the first memory, that is, there is a relationship between a first computing node corresponding to the first processor and a first storage node corresponding to the first memory.

If it is perceived (i.e., detected) that there is communication between a second processor of the first IoT device and a second memory of a first IoT device, the electronic device may determine that there is a communication relationship between the second processor and the second memory, that is, there is a relationship between a second computing node corresponding to the second processor and a second storage node corresponding to the second memory.

If it is perceived (that is, detected) that there is communication between a third processor of the first IoT device and a fourth processor of a second IoT device, the electronic device may determine that there is a communication relationship between the third processor and the fourth processor, that is, there is a relationship between a third computing node corresponding to the third processor and a fourth computing node corresponding to the fourth processor.

If it is perceived (that is, detected) that there is communication between a third memory of the first IoT device and a fourth memory of a second IoT device, the electronic device may determine that there is a communication relationship between the third memory and the fourth memory, that is, there is a relationship between a third storage node corresponding to the third memory and a fourth storage node corresponding to the fourth memory.

If it is perceived (that is, detected) that there is communication between a fifth processor and a sixth processor of the first IoT device, the electronic device may determine that there is a communication relationship between the fifth processor and the sixth processor, that is, there is a relationship between a fifth computing node corresponding to the fifth processor and a sixth computing node corresponding to the sixth processor.

If it is perceived (that is, detected) that there is communication between a fifth memory and a sixth memory of a second IoT device, the electronic device may determine that there is a communication relationship between the fifth memory and the sixth memory, that is, there is a relationship between a fifth storage node corresponding to the fifth memory and a sixth storage node corresponding to the sixth memory.

If one IoT device and the computing capability of the IoT device are perceived (that is, detected), the electronic device can determine that there is a perceived subordinate relationship between the IoT device and the computing capability, that is, there is a relationship between a corresponding device node and at least one computing node. In practical applications, whether to explicitly reflect this relationship in the form of "edge" in the resource knowledge graph can be selected.

If one IoT device and the storage capability of the IoT device are perceived (that is, detected), the electronic device can determine that there is a perceived subordinate relationship between the IoT device and the storage capability, that is, there is a relationship between a corresponding device node and at least one storage node. In practical applications, whether to explicitly reflect this relationship in the form of "edge" in the resource knowledge graph can be selected.

In practical applications, since the capabilities of IoT devices and the relationship between IoT devices are dynamically changing, in order to enable the information corresponding to the virtualized resource knowledge graph to be consistent with the information corresponding to the physical IoT device, and improve the accuracy of the resource knowledge graph, the changes of the IoT devices need to be monitored, so that the resource knowledge graph can be dynamically updated with the changes of IoT devices.

Based on this, in an embodiment, the method may further include:
  monitoring the IoT device;
  updating, in a case that a change occurred in the IoT device is monitored, the resource knowledge graph based on the monitored change of the IoT device.

In actual applications, the manner of monitoring the IoT device can be set according to requirements, which is not limited in this embodiment of the present application. For example, change in the IoT device can be monitored in a manner of periodic polling.

Here, the monitoring of the change in the IoT device may include at least one of the following:
  discovering a new IoT device;
  monitoring that the IoT device is disconnected from a network connection;
  monitoring a change in a computing capability of the IoT device;
  monitoring a change in a storage capability of the IoT device;
  monitoring a change in a relationship between IoT devices;
  monitoring a change in the relationship between at least part of the capabilities on the IoT device,
  where the updating, in a case that a new IoT device is discovered, the resource knowledge graph may include: detecting the capability of the discovered new IoT device; abstracting, based on the detected capability of the new IoT device, the new IoT device into corresponding nodes, where the nodes include at least one of a device node, a computing node and a storage node; determining the characteristic of each node in the at least one new node; and detecting the relationship between the new IoT device and other IoT devices; determining, according to the detected relationship between the new IoT device and other IoT devices, the relationship between at least one new node and other nodes; connecting, according to the determined characteristic of each node in the at least one new node and the determined relationship between the at least one new node and other nodes, the at least one new node with other nodes, so as to update the resource knowledge graph.

The updating, if it is monitored that the IoT device is disconnected from the network connection, the resource knowledge graph may include: determining the nodes corresponding to the IoT device disconnected from the network connection in the resource knowledge graph, where the nodes include at least one of a device node, a computing node, and a storage node; detecting a change in a relationship between the IoT device disconnected from the network connection and other IoT devices; and detecting a change in the relationship between the capability of the IoT device disconnected from the network connection and the capabilities of other IoT devices; updating, according to the detected change in the relationship between the IoT device disconnected from the network connection and other IoT devices, and the detected change in the relationship between the capability of the IoT device disconnected from the network connection and the capabilities of other IoT devices, the relationship between at least one node corresponding to the IoT device disconnected from the network connection in the resource knowledge graph and other nodes; deleting, in a case that it is determined that the communication connection between the IoT device disconnected from the network connection and other IoT devices is disconnected, and the communication connections between the capability of the IoT device disconnected from the network connection and the capabilities of other IoT devices are also disconnected, at least one node corresponding to the IoT device disconnected from the network connection in the resource knowledge graph from the resource knowledge graph.

The updating, in a case that a change in the computing capability of the IoT device is monitored, the resource knowledge graph may include at least one of the following:
  updating, according to the monitored change in the computing capability, the characteristic of each node in at least one node corresponding to the corresponding IoT device in the resource knowledge graph;
  updating, according to the monitored change in computing capability, the relationship between the corresponding device node and a computing node;
  updating, according to the monitored change in computing capability, the relationship between the corresponding computing node and other capability nodes (also called resource nodes, including a computing node and a storage node).

The updating, in a case that a change in the storage capability of the IoT device is monitored, the resource knowledge graph may include at least one of the following:
  updating, according to the monitored change in storage capability, the characteristic of each node in at least one node corresponding to the corresponding IoT device in the resource knowledge graph;
  updating, according to the monitored change in storage capability, the relationship between the corresponding device node and the storage node;
  updating, according to the monitored change in the storage capability, the relationship between the corresponding storage node and other capability nodes (also called resource nodes, including the computing node and the storage node).

The monitoring the change in the relationship between IoT devices may include: monitoring a change in a communication strength between IoT devices; at this time, the updating the resource knowledge graph may include: determining that at least two corresponding nodes corresponding to the IoT device in the resource knowledge graph; determining, according to the monitored change in the communication strength between the IoT devices, the change in the relationship between the at least two nodes; and updating the resource knowledge graph according to the change in the relationship between the at least two nodes.

The monitoring the change in the relationship between at least part of the capabilities on the IoT device may include at least one of the following:
  monitoring a change in the communication strength between at least part of capabilities on one IoT device and other capabilities on the same IoT device;
  monitoring a change in the communication strength between at least part of the capabilities on one IoT device and at least part of the capabilities on another IoT device that have a communication relationship;
  monitoring a change in the subordinate relationship between all capabilities on one IoT device and part of the capabilities of the same IoT device.

Correspondingly, the updating the resource knowledge graph may include: determining, according to the monitored change in the relationship between at least part of capabilities on the IoT device, a change in the relationship between corresponding two nodes; and updating the resource knowledge graph according to the change in the relationship between the at least two nodes.

In step 103, in actual applications, the managing the available capabilities (that is, idle resources) on heterogeneous IoT devices may be understood as performing unified structured representation and organic organization on multiple heterogeneous IoT devices and the capabilities of each IoT device, so as to break the barriers of resource sharing brought about by the heterogeneity of physical hardware, so that the system can have a global control over the IoT devices in the environment, the capabilities of the IoT devices, the relationship between the IoT devices, and the relationship between at least part of the capabilities on the IoT devices.

The orchestrating the available capabilities on the heterogeneous IoT devices may be understood as performing an efficient scheduling on IoT devices based on the resource knowledge graph, that is, performing, based on the IoT devices, capabilities of IoT devices, relationship between IoT devices, relationship between at least part of the capabilities on the IoT devices, and the matching relationship between the capability requirement of the task to be processed and the available capabilities provided in the resource knowledge graph, reasonable scheduling on different IoT devices and their capabilities, to meet the resource requirement of the task, and finally complete the efficient execution of the entire task.

Based on this, in an embodiment, the method may further include:
  obtaining a task to be processed;
  assigning, based on the resource knowledge graph, at least one node to the task to be processed, where the at least one node is configured to execute the task to be processed.

Here, the task to be processed can also be called a task to be executed, and the type of the task to be processed can be set according to requirements, such as training or reasoning a deep model (also called a machine learning model, a machine learning task, a deep learning model, a deep learning task, a deep neural network, or a deep neural network model). The manner of obtaining the task to be processed can also be set according to requirements, for example, obtaining the task to be processed locally; as another example, obtaining the task to be processed from other electronic devices.

In practical applications, in order to improve the efficiency of executing the task to be processed, at least one node may be assigned to the task to be processed based on the resource requirement of the task to be processed.

Based on this, in one embodiment, the assigning, based on the resource knowledge graph, at least one node to the task to be processed may include:

determining the resource requirement of the task to be processed; determining at least one node matched with the resource requirement from the resource knowledge graph, where the resource requirement represents at least one of the following resources that need to be occupied to execute the task to be processed:
a computing resource;
a storage resource;
a communication resource.

Here, the communication resource may include a bandwidth (i.e. a communication bandwidth consumption) occupied by information exchange or data transmission between at least two nodes during the execution of the task to be processed.

In one embodiment, the determining at least one node matched with the resource requirement from the resource knowledge graph may include:

performing search directed to the resource requirement based on the characteristic of each node in the resource knowledge graph and the relationship among nodes;
determining, based on the search result, at least one node matched with the resource requirement.

The information processing method based on the IoT device provided by an embodiment of the present application includes: discovering the IoT device; and detecting a capability of the IoT device; abstracting, for each IoT device, the IoT device into a corresponding node based on the capability of corresponding IoT device; generating, based on the abstracted node, a resource knowledge graph, where the node represents at least part of the capabilities of one IoT device; an edge in the resource knowledge graph represents a relationship between two adjacent nodes; and the resource knowledge graph is configured to manage and/or orchestrate the available capabilities on a heterogeneous IoT device. The solutions of the embodiments of the present application includes: performing the intelligent perception of the IoT device and its capabilities (that is, idle resources of the IoT device), and abstracting, through virtualization and software-definition technologies, the IoT device into the corresponding node based on perceived capabilities, and generating a resource knowledge graph based on the abstracted node, where the generated resource knowledge graph can be used to manage and/or orchestrate the available capabilities on the heterogeneous IoT devices, so that resource-constrained and highly heterogeneous IoT device can be efficiently managed and flexibly scheduled based on the resource knowledge graph, which provides a prerequisite for the realization of edge computing in AI-based application scenarios (that is, the realization of computing-intensive computing tasks), so that the user do not need to transmit data related to personal privacy to the cloud data center, thereby enhancing privacy protection, reducing the transmission delay, and improving the user experience.

The present application will be further described in detail below in conjunction with application embodiments.

Figure 2:
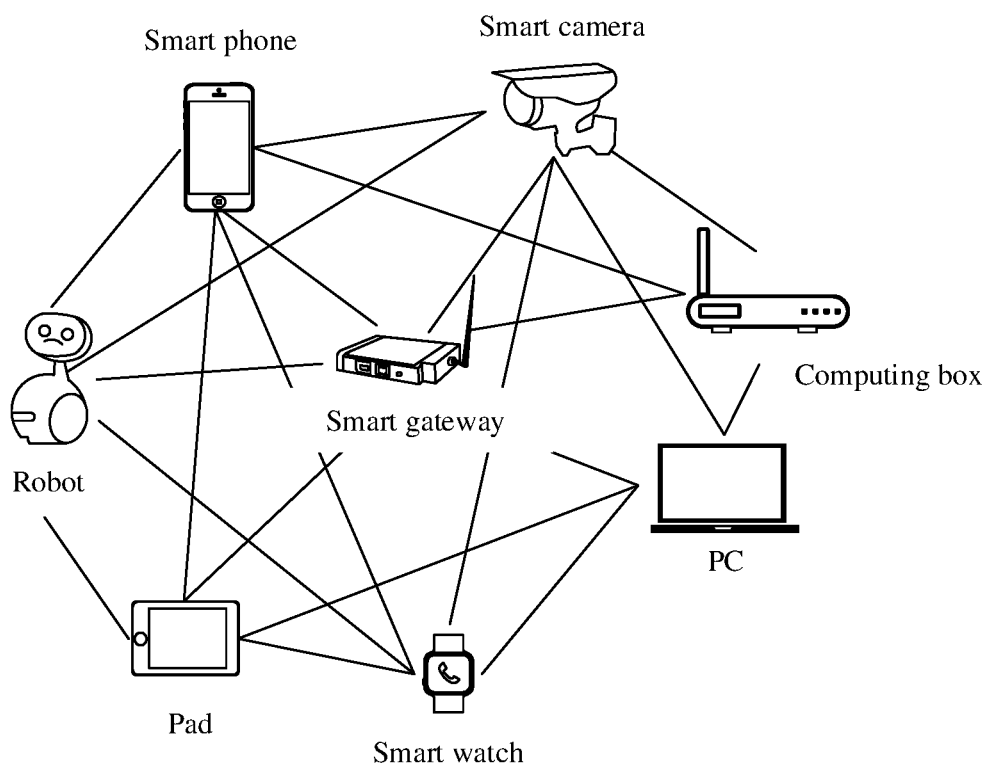
FIG. 2 is a schematic view of an edge infrastructure of an Internet of Things.

As shown in FIG. 2, a variety of IoT devices are scatteredly distributed in space (geographic location), these IoT devices (such as smartphones, smart cameras, smart watches, computing boxes, PCs, tablet computers, robots, etc.) can realize interconnection and interoperability through WiFi, Bluetooth, ZigBee protocol (ZigBee), narrowband Internet of Things (NB-IoT), near field communication (NFC) and other technologies, and constitute the edge infrastructure of the Internet of Things. In this scenario, device resources refer to: available computing resources on IoT devices, available storage resources on IoT devices, and bandwidth resources provided by the edge computing network for inter-device communication. Since the resources on one IoT device are extremely limited, it is impossible to complete (i.e. execute or process) computing-intensive computing tasks alone, such as deep learning tasks, especially computing tasks for training deep models.

Therefore, in order to enable the variety of IoT devices to collaboratively perform computing-intensive computing tasks, that is, realize distributed (or decentralized) computing through the IoT edge infrastructure shown in FIG. 2, it is necessary to perform unified management and efficient scheduling on the distributed devices (that is, IoT devices used to implement distributed computing) in the scenario shown in FIG. 2, so as to solve the problem on the complexity and uncertainty of resource collaboration and interaction between heterogeneous IoT devices, in this application embodiment, technologies such as virtualization, software definition, and knowledge graphs are used to construct the service capability abstraction module and resource knowledge graph construction module; the intelligent perception and unified management of computing resources, storage resources and communication resources on the varieties of distributed heterogeneous IoT devices are realized through the service capability abstraction module and resource knowledge graph construction module, and the intelligent adaptive adjustment of the device frequently entering and exiting a system (that is, the frequent switching of the device between the connected network state and the unconnected network state) and the dynamic changes of the device resources is realized through the dynamic update mechanism of the resource knowledge graph, thereby providing the possibility to make full use of idle resources on smart devices to maximize resource utilization, and providing conditions for the efficient execution of computing tasks based on resource sharing and device collaboration on the IoT devices.

Figure 3:
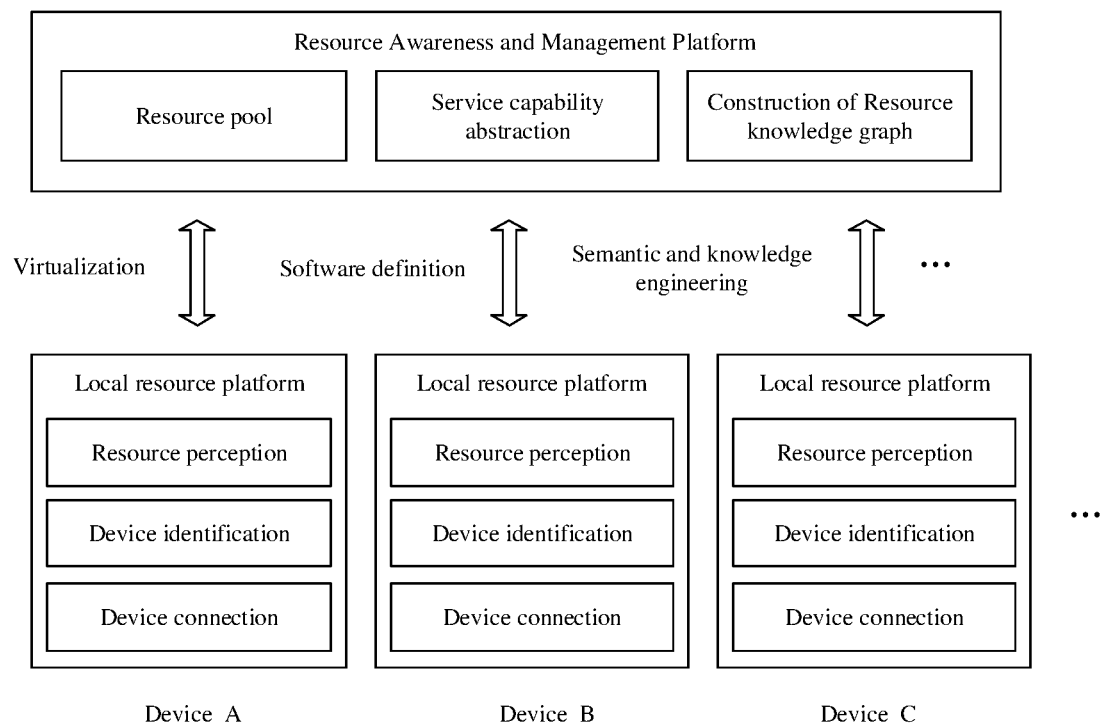
FIG. 3 is a schematic view of a system structure for managing an Internet of Things (IoT) device by a resource awareness and management platform of an application embodiment of the present application.

This application embodiment provides a resource awareness and management platform (RAMP, Resource Awareness and Management Platform), as shown in FIG. 3, in the process of unified management of heterogeneous IoT devices, it mainly involves the interaction between RAMP and the local resource platform configured on the IoT devices, where the core of RAMP is the service capability abstraction module and the resource knowledge graph construction module; RAMP is used to collaboratively and distributedly execute computing-intensive tasks by making full use of idle resources on heterogeneous IoT devices in edge computing scenarios where resources of a single device are limited, such as training and inference of deep learning models.

The functions of RAMP are described in detail below.

Figure 4:
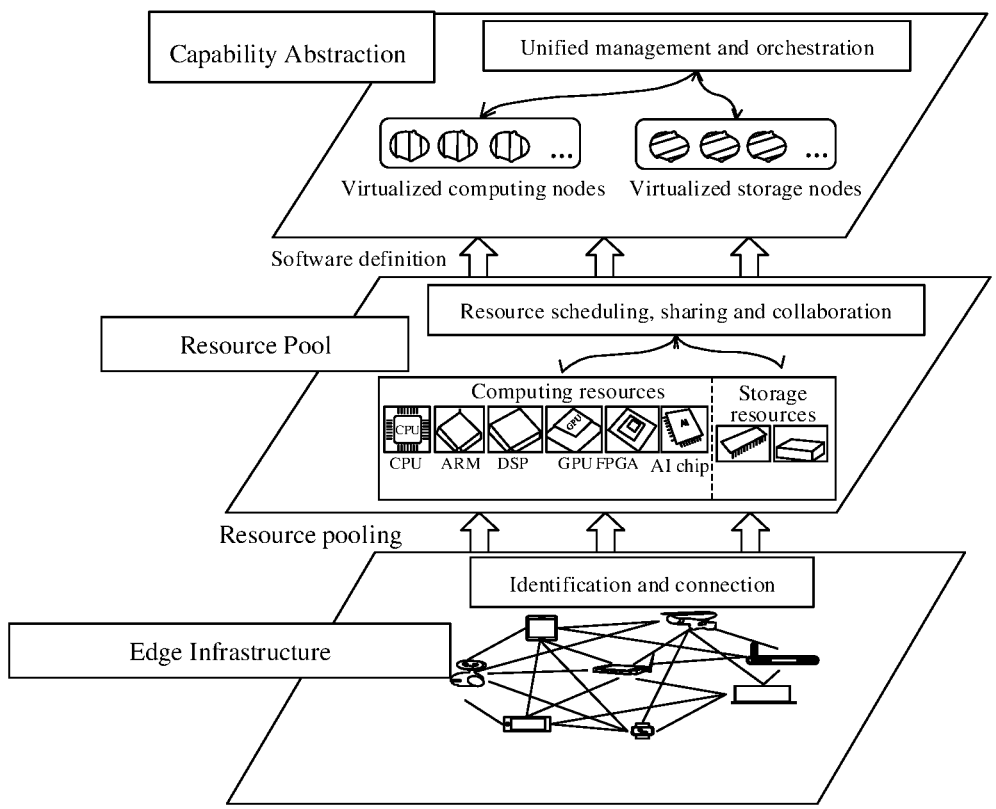
FIG. 4 is a schematic view of an application scenario of a service capability abstraction module in an application embodiment of the present application.

Firstly, the functions of the service capability abstraction module are described in conjunction with FIG. 4.

Here, the service capability abstraction module is used to abstract the service capabilities of the IoT device. The IoT device refers to an IoT smart terminal device with certain computing capability and/or storage capability, such as a smart gateway, a computing box, a service robot, a smart camera, a smart phone, a personal computer, a smart wearable device, etc. These IoT devices are usually highly heterogeneous and resource-constrained (i.e., limited computing capability, storage capability and communication capability). The service capability abstraction module is mainly used to solve the heterogeneous problem among IoT devices, the role of the service capability abstraction module is to break the boundaries between heterogeneous hardware and realize resource perception, abstraction and virtualization on various physical IoT devices, and map them to the virtual resource nodes on the logical devices that can be scheduled by RAMP.

With the explosive development of the Internet of Things and smart hardware, the demand for deploying smart applications to widely distributed IoT devices is also growing. Mapping the workload of computing tasks (such as machine learning models) to these heterogeneous devices (that is, allowing these heterogeneous devices to collaboratively perform computing tasks) faces the challenge of diversity in hardware characteristics. These heterogeneous hardware include: embedded CPU, GPU, FPGA, Application Specific Integrated Circuit (ASIC, Application Specific Integrated Circuit), etc. These hardware differ in terms of memory organization, computing functional units, and so on. By using the service capability abstraction module, technologies such as virtualization and software definition can be used to realize the unified management and scheduling of these scattered heterogeneous resources.

As shown in FIG. 4, based on different types of processors, computing resources on the IoT devices may be divided into: CPU, GPU, FPGA, ARM, AI chips and other types of computing resources; memory resources (that is, storage resources) may include cache, RAM, etc.; scheduling, sharing and collaboration of computing resources and storage resources can be realized through resource pooling. Computing resources and storage resources can be further virtualized and abstracted into corresponding computing nodes and storage nodes through software-definition technology, thereby realizing unified management and/or orchestration of resources. It can be seen that the service capability abstraction module facilitates resource scheduling across heterogeneous IoT devices and contributes to the discovery and finding of suitable resources that meet the specific computing demands of computing-intensive computing tasks. Various device resources (that is, various processing capabilities of the device) can be perceived, reused and shared to improve resource utilization through the service capability abstraction module, thereby improving the overall service capability of the IoT device terminal.

Figure 5:
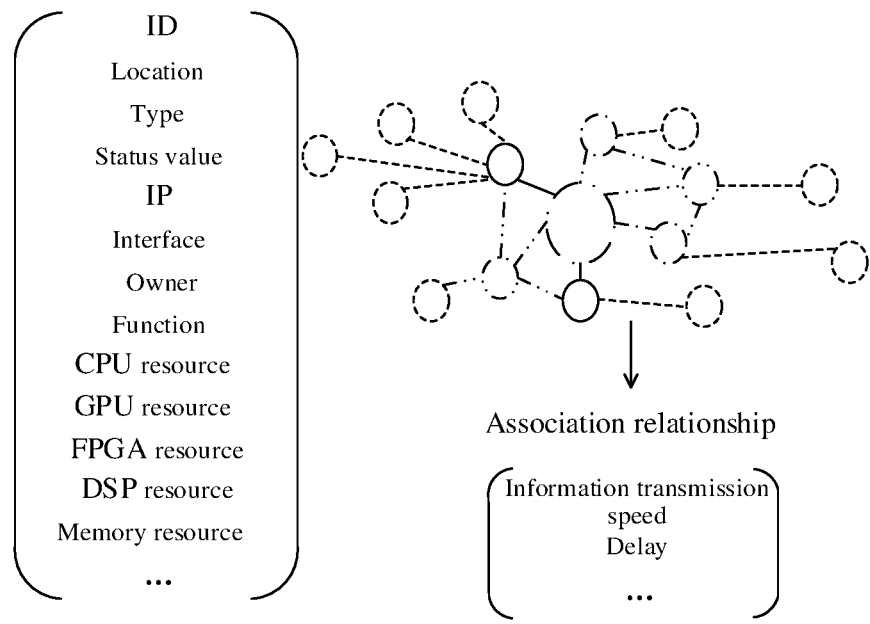
FIG. 5 is a schematic view of a resource knowledge graph construction module in an application embodiment of the present application.

Next, the functions of the resource knowledge graph construction module are described in conjunction with FIG. 5.

In order to enable the IoT edge computing system to dynamically perceive and fully understand the available device resources (device resources refer to available computing resources on IoT devices, available storage resources on IoT devices, and bandwidth resources provided by the edge computing network for inter-device communication), the resource knowledge graph construction module uses semantic and knowledge engine technology to describe and model these IoT devices, and further constructs the resource knowledge graph based on the nodes abstracted by the service capability abstraction module. As shown in FIG. 5, in the resource knowledge graph, nodes represent different IoT devices or finer-grained computing capabilities or storage capabilities abstracted from devices, that is, the nodes in FIG. 5 include: virtualized device nodes, computing nodes and storage nodes. Each node corresponds to one ontology description model (that is, the above-mentioned characteristic), which is at least used to describe the device information and at least part of the capability information of one IoT device represented by the corresponding nodes. Exemplarily, for a device node, the ontology description model may include the following information: IoT device information (including a device ID, a location, a type, a status value, a function, an owner, an interface, IP information, etc.), and capability information (CPU, GPU, FPGA, DSP, memory resources, etc.), etc. The edges in the resource knowledge graph represent the association relationship between adjacent nodes, such as: communication relationship (i.e., wired or wireless communication relationship) and/or subordinate relationship. IoT device resources represented by association relationships help to demonstrate the internal collaboration and sharing mechanisms of various heterogeneous devices.

In order to adapt to the dynamic IoT edge scenarios, cope with the challenges brought about by fluctuations in available resources, and maintain the consistency between physical IoT devices and virtualized device resources, it is necessary to consider the automatic construction and dynamic update mechanism of resource knowledge graph. Through this mechanism, when a terminal device accesses the system or the status of the terminal device changes or the terminal device exits the system, the corresponding resource knowledge graph will also be updated synchronously. In addition, some scheduling and orchestration strategies (such as nodes whose storage capability meets preset conditions are scheduled with a high priority) and sharing and collaboration mechanisms can be set in advance to improve resource utilization and overall service capabilities. Based on the resource knowledge graph construction module, the edge computing system can efficiently manage and flexibly schedule limited available resources on heterogeneous distributed (or decentralized) IoT devices to meet the resource requirements of computing tasks.

Figure 6:
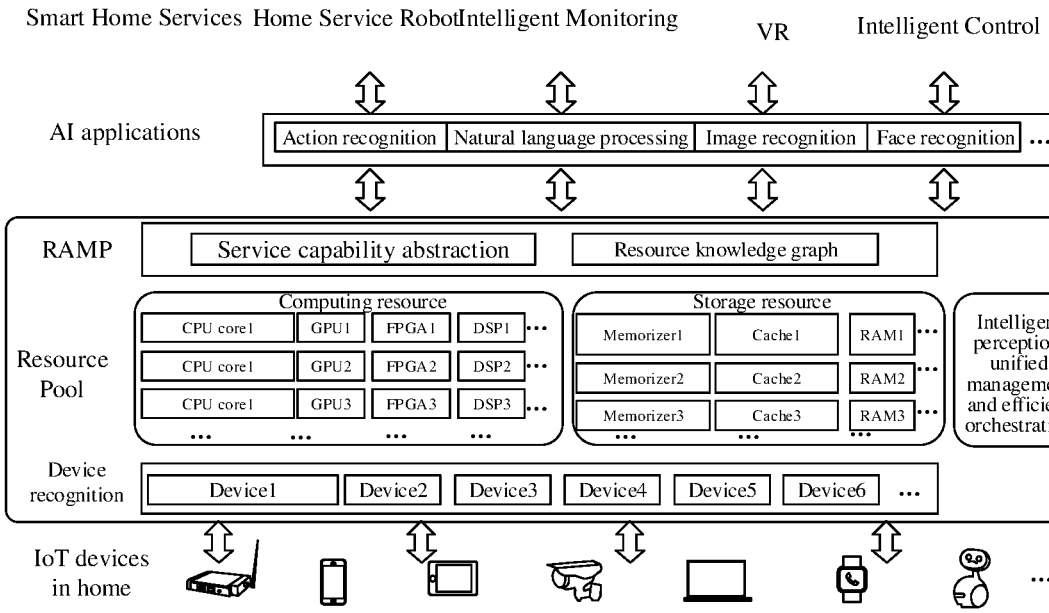
FIG. 6 is a schematic view of an application scenario of a resource awareness and management platform in an application embodiment of the present application.
Figure 7:
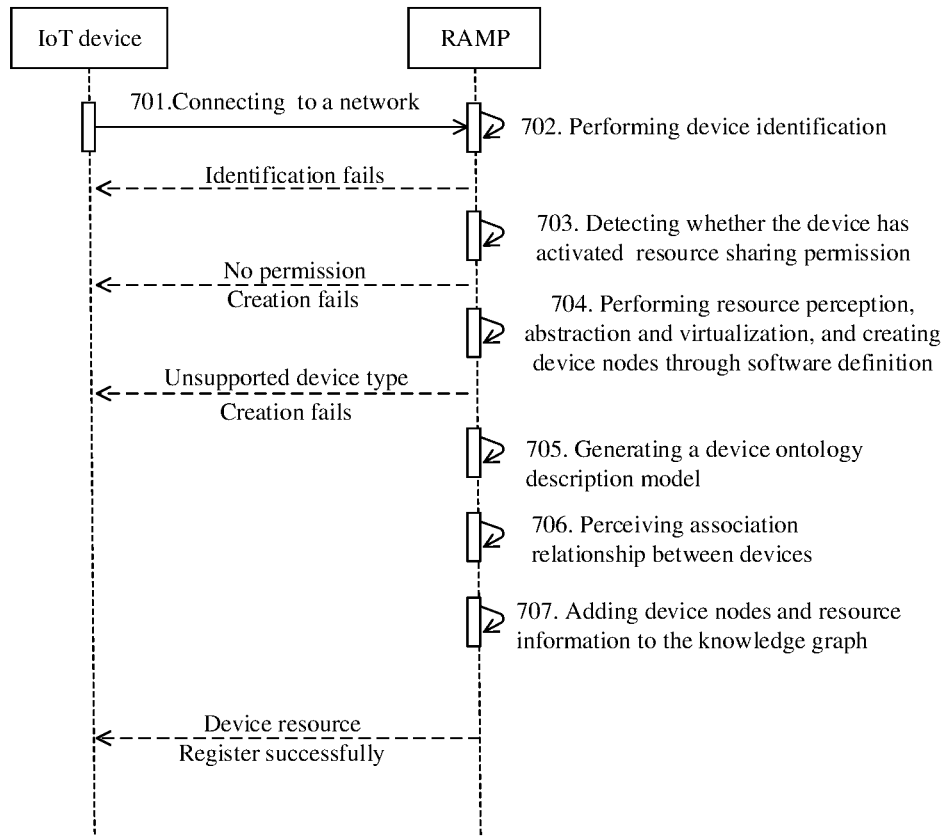
FIG. 7 is a flowchart of interaction between the resource awareness and management platform and the IoT device in the application embodiment of the present application.

FIG. 6 shows the application scenario of implementing a smart home by RAMP. Based on the application scenario shown in FIG. 6, as shown in FIG. 7, the process of interaction between RAMP and IoT devices may include the following steps:

Step 701: IoT device is connected to the network; then executes step 702.

Specifically, the IoT device accesses the network.

Step 702: RAMP performs device identification; if the identification is successful, then step 703 is executed.

Specifically, RAMP can perform device identification (that is, detection) based on a preset method, and if the identification fails, identification failure information is returned to the IoT device; if the identification is successful, step 703 can be continued.

RAMP interacts with the local resource platform on the IoT device for performing the device identification.

Step 703: RAMP detects whether the device has activated the resource sharing permission; if the detection result represents that the device has activated the resource sharing permission, then step 704 is executed.

Specifically, RAMP can detect whether the device has activated the resource sharing permission based on a preset method; if the detection result represents that the device has not activated the resource sharing permission, the node cannot be created, and RAMP returns creation failure information to the IoT device; if the detection result represents that the device has activated the resource sharing permission, then step 704 can be continued.

Step 704: RAMP performs resource perception, abstraction and virtualization, and creates device nodes through software definition; then executes step 705.

Specifically, RAMP can perceive (that is, detect) the resources of IoT device based on a preset method, and use software-definition technology to abstract the resources (that is, capabilities) of physical IoT device into virtualized nodes.

RAMP interacts with the local resource platform on the IoT device for performing the resource perception.

Step 705: RAMP generates a device ontology description model; then executes step 706.

Specifically, RAMP can generate a device ontology description model based on the resources of the corresponding IoT device.

Step 706: RAMP perceives the association relationship between devices; and then executes step 707.

Step 707: RAMP adds device nodes and resource information to the knowledge graph.

Figure 8:
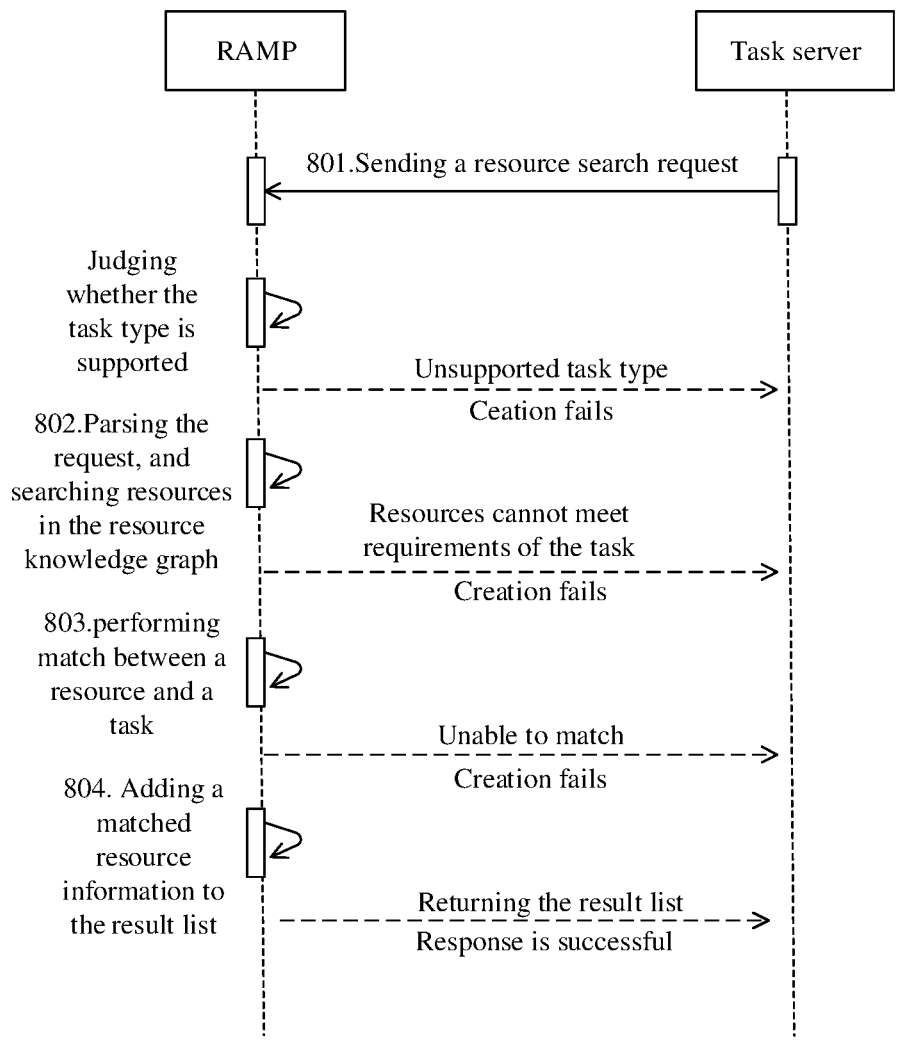
FIG. 8 is a flowchart of interaction between the resource awareness and management platform and a computing task server in the application embodiment of the present application.

Based on the application scenario shown in FIG. 6, as shown in FIG. 8, the process of interaction between RAMP and the task server may include the following steps:

Step 801: the task server sends a resource search request to RAMP, and RAMP judges whether the task type is supported; if the judgment result represents that the task type is supported, then step 802 is executed.

Step 802: RAMP parses the request, and searches resources in the resource knowledge graph; if the resource is searched, then step 803 is executed.

Step 803: RAMP performs resource task matching; if the matching is successful, then step 804 is executed.

Step 804: RAMP adds the matched resource information to the result list.

The solutions provided by the application embodiment have the following advantages that:
1) fine-grained intelligent perception, virtualization and software definition are performed on multiple computing resources (CPU, GPU, FPGA, DSP, etc.) and storage resources (Memory, RAM, etc.) on the IoT device;
2) in a dynamically changing IoT scenario, in a case that the devices frequently enter and exit the system (that is, devices frequently switch between connected status and unconnected status) and device resources dynamically change, the intelligent adaptive resource dynamic perception and automatic update of the resource knowledge graph can be realized;
3) the structured representation and unified management can be performed on multiple types of idle resources on various heterogeneous IoT devices, so that the system can fully understand and efficiently schedule the widely distributed available resources on the various heterogeneous IoT devices when performing computing-intensive computing tasks, and improve the system performance by maximizing resource utilization.

Figure 9:
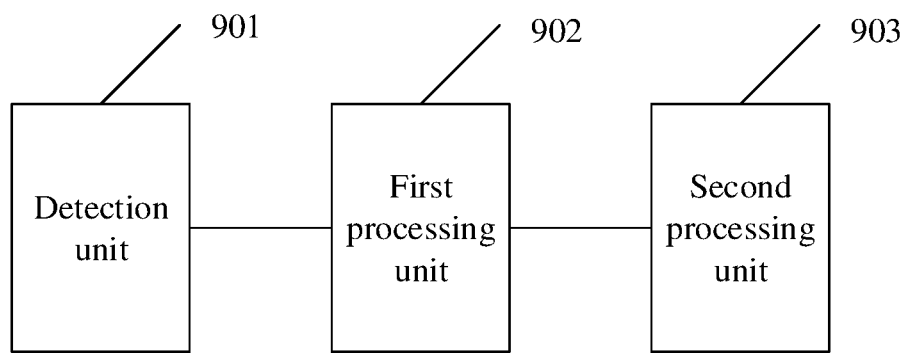
FIG. 9 is a schematic structural view of an information processing apparatus according to an embodiment of the present application.

In order to implement the method of the embodiment in the present application, the embodiment of the present application also provides an information processing apparatus based on an Internet of Things (IoT) device, as shown in FIG. 9, the apparatus includes:
a detecting unit 901, configured to discover the IoT devices; and detect capabilities of the IoT devices;
a first processing unit 902, configured to abstract, for each IoT device, the corresponding IoT device into a corresponding node based on the capability of the IoT device;
a second processing unit 903, configured to generate, based on the abstracted node, a resource knowledge graph, where the node represents at least part of the capabilities of one IoT device; an edge in the resource knowledge graph represents a relationship between two adjacent nodes; and the resource knowledge graph is configured to manage and/or orchestrate the available capabilities on a heterogeneous IoT device,
where the available capabilities include at least one of the following: a computing capability; a storage capability; a communication capability.

In an embodiment, the second processing unit 903 is configured to:
determine a characteristic of each node, and determine a relationship among a plurality of nodes; where the characteristic is at least configured to describe IoT device information corresponding to the corresponding node and at least part of the capability information of the IoT device;
generate, based on the determined characteristic and the relationship among nodes, the resource knowledge graph,
where the edge in the resource knowledge graph represents at least one of the following: a communication relationship between two IoT devices; a relationship between at least part of the capabilities on the IoT device.

In an embodiment, the detecting unit 901 is configured to monitor the IoT device;
the second processing unit 903 is configured to update, in a case that a change occurred in the IoT device is monitored by the detecting unit 901, the resource knowledge graph based on the change condition of the IoT device monitored by the detecting unit 901,
where the detecting unit 901 is configured to execute at least one of the following:
discovering a new IoT device;
monitoring that the IoT device is disconnected from a network connection;
monitoring a change in a computing capability of the IoT device;
monitoring a change in a storage capability of the IoT device;
monitoring a change in a relationship between IoT devices;
monitoring a change in the relationship between at least part of the capabilities on the IoT device.

In an embodiment, the apparatus also includes:
an obtaining unit, configured to obtain a task to be processed;
a third processing unit, configured to assign, based on the resource knowledge graph, at least one node to the task to be processed, where the at least one node is configured to execute the task to be processed.

In an embodiment, the third processing unit is configured to:
determine resource requirement of the task to be processed; determine at least one node matched with the resource requirement from the resource knowledge graph, where the resource requirement represents at least one of the following resources that need to be occupied to execute the task to be processed:
a computing resource;

a storage resource;
a communication resource.

In an embodiment, the third processing unit is configured to:

perform search directed to the resource requirement based on the characteristic of each node in the resource knowledge graph and the relationship among nodes;
determine, based on the search result, at least one node matched with the resource requirement.

In actual applications, the detecting unit 901 and the obtaining unit can be implemented by a processor in an information processing apparatus combined with a communication interface; the first processing unit 902, the second processing unit 903 and the third processing unit can be implemented by a processor in an information processing apparatus.

It should be noted that: when the information processing apparatus provided by the above-mentioned embodiment performs information processing, the division of the above-mentioned program modules is used as an example for illustration, in actual applications, the above-mentioned processing can be respectively completed by different program modules according to needs, that is, the internal structure of the apparatus is divided into different program modules to complete all or part of the processing described above. In addition, embodiments of the information processing apparatus and the information processing method provided in the above-mentioned embodiments belong to the same concept, and the specific implementation process thereof is detailed in the method embodiments, and will not be repeated here.

Figure 10:
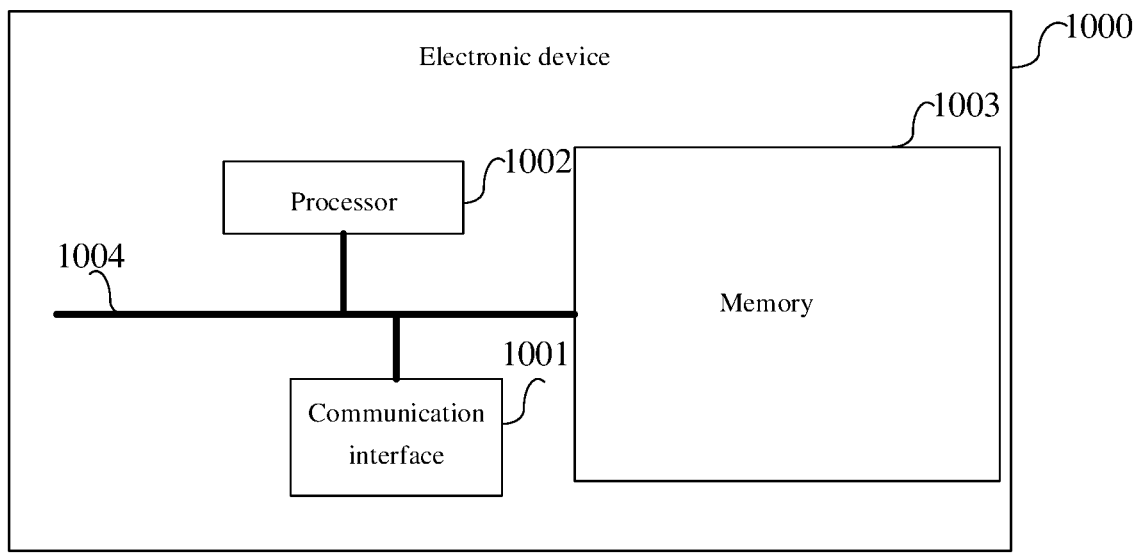
FIG. 10 is a schematic structural view of an electronic device according to an embodiment of the present application.

Based on the hardware implementation of the above-mentioned program modules, and in order to implement the method of the embodiment in the present application, the embodiment of the present application also provides an electronic device, as shown in FIG. 10, the electronic device 1000 includes:

a communication interface 1001, capable of performing information interaction with other electronic devices;
a processor 1002, connected to the communication interface 1001 to implement information interaction with other electronic devices, and configured to execute the methods provided by one or more of the above-mentioned technical solutions when executing a computer program;
a memory 1003, configured to store the computer program that can be executed on the processor 1002.

Specifically, the processor 1002 is configured to:
discover the IoT devices through the communication interface 1001; and detect capabilities of the IoT devices;
abstract, for each IoT device, the IoT device into corresponding nodes based on the capabilities of the corresponding IoT device;
generate, based on the abstracted nodes, a resource knowledge graph, where the nodes represent at least part of the capabilities of one IoT device; an edge in the resource knowledge graph represents a relationship between two adjacent nodes; and the resource knowledge graph is configured to manage and/or orchestrate the available capabilities on a heterogeneous IoT device,
where the available capabilities include at least one of the following: a computing capability; a storage capability; a communication capability.

In an embodiment, the processor 1002 is configured to:
determine a characteristic of each node, and determine relationship among a plurality of nodes; where the characteristic is at least configured to describe IoT device information corresponding to the corresponding node and at least part of the capability information of the IoT device;
generate, based on the determined characteristic and the relationship among nodes, the resource knowledge graph,
where the edge in the resource knowledge graph represents at least one of the following:
a communication relationship between two IoT devices;
a relationship between at least part of the capabilities on the IoT device.

In an embodiment, the processor 1002 is configured to monitor the IoT device through the communication interface 1001;
update, in a case that a change occurred in the IoT device is monitored, the resource knowledge graph based on the monitored change condition of the IoT device.

In an embodiment, the processor 1002 is configured to execute at least one of the following:
discovering a new IoT device;
monitoring that the IoT device is disconnected from a network connection;
monitoring a change in a computing capability of the IoT device;
monitoring a change in a storage capability of the IoT device;
monitoring a change in a relationship between IoT devices;
monitoring a change in the relationship between at least part of the capabilities on the IoT device.

In an embodiment, the processor 1002 is configured to:
obtain a task to be processed;
assign, based on the resource knowledge graph, at least one node to the task to be processed, where the at least one node is configured to execute the task to be processed.

In an embodiment, the processor 1002 is configured to:
determine resource requirement of the task to be processed; determine at least one node matched with the resource requirement from the resource knowledge graph, where the resource requirement represents at least one of the following resources that need to be occupied to execute the task to be processed:
a computing resource;
a storage resource;
a communication resource.

In an embodiment, the processor 1002 is configured to:
perform search directed to the resource requirement based on the characteristic of each node in the resource knowledge graph and the relationship among nodes;
determine, based on the search result, at least one node matched with the resource requirement.

It should be noted that: the specific process of the processor 1002 performing the above-mentioned operations can be found in the method embodiments, and will not be repeated here.

Of course, in practical applications, various components in the electronic device 1000 are coupled together through the bus system 1004. It can be understood that the bus system 1004 is used to realize connection and communication between these components. In addition to the data bus, the bus system 1004 also includes a power bus, a control bus and a status signal bus. However, the various buses are labeled as bus system 1004 in FIG. 10 for clarity of illustration.

The memory 1003 in the embodiment of the present application is used to store various types of data to support the operation of the electronic device 1000. Examples of such data include: any computer program operated on the electronic device 1000.

The methods disclosed in the foregoing embodiments of the present application may be applied to the processor 1002 or implemented by the processor 1002. The processor 1002 may be an integrated circuit chip with signal processing capability. In the implementation process, each step of the above-mentioned method may be completed by an integrated logic circuit of hardware in the processor 1002 or instructions in the form of software. The aforementioned processor 1002 may be a general-purpose processor, DSP, GPU, or other programmable logic devices, discrete gate or transistor logic devices, discrete hardware components, and the like. The processor 1002 may implement or execute various methods, steps, and logic block diagrams disclosed in the embodiments of the present application. A general-purpose processor may be a microprocessor or any conventional processor or the like. The steps of the method disclosed in the embodiments of the present application may be directly implemented by a hardware decoding processor, or implemented by a combination of hardware and software modules in the decoding processor. The software module may be located in a storage medium, the storage medium is located in the memory 1003, and the processor 1002 reads the information in the memory 1003, and completes the steps of the foregoing method in combination with its hardware.

In an exemplary embodiment, the electronic device 1000 may be implemented by one or more ASICs, DSP, programmable logic devices (PLD, Programmable Logic Device), complex programmable logic devices (CPLD, Complex Programmable Logic Device), FPGAs, general processors, GPUs, controllers, microcontrollers (MCU, Micro Controller Unit), microprocessors (Microprocessor), various AI chips, brain-like chips, or other electronic components, which are used to execute the aforementioned method.

It can be understood that the memory 1003 in this embodiment of the present application may be a volatile memory or a non-volatile memory, and may also include both volatile and non-volatile memories, where the non-volatile memory may be ROM, Programmable Read-Only Memory (PROM, Programmable Read-Only Memory), Erasable Programmable Read-Only Memory (EPROM, Erasable Programmable Read-Only Memory), Electrically Erasable Programmable read-only memory (EEPROM, Electrically Erasable Programmable Read-Only Memory), FRAM, flash memory (Flash Memory), magnetic surface memory, optical disc, or compact disc read-only memory (CD-ROM, Compact Disc Read-Only Memory); the magnetic surface memory may be a disk memory or a tape memory. The volatile memory may be RAM, which acts as external high-speed cache. By way of illustration and not limitation, many forms of RAM are available, such as a static random access memory (SRAM, Static Random Access Memory), a synchronous static random access memory (SSRAM, Synchronous Static Random Access Memory), a dynamic random access memory (DRAM, Dynamic Random Access Memory), synchronous dynamic random access memory (SDRAM, Synchronous Dynamic Random Access Memory), a double data rate synchronous dynamic random access memory (DDRSDRAM, Double Data Rate Synchronous Dynamic Random Access Memory), an enhanced synchronous dynamic random access memory (ESDRAM, Enhanced Synchronous Dynamic Random Access Memory), a syncLink dynamic random access memory (SLDRAM, SyncLink Dynamic Random Access Memory), a direct rambus random access memory (DRRAM, Direct Rambus Random Access Memory). The memories described in the embodiments of the present application are intended to include but not limited to these and any other suitable types of memories.

In order to implement the method provided in the embodiment of the present application, the embodiment of the present application also provides an information processing system based on the IoT device, which includes:
  a first functional component, configured to discover the IoT devices; and detect capabilities of the IoT devices;
  a second functional component, configured to abstract, for each IoT device, the IoT device into a corresponding node based on the capabilities of the corresponding IoT device; and generate, based on the abstracted node, a resource knowledge graph, where the first functional component and the second functional component are arranged on two electronic devices.

Figure 11:
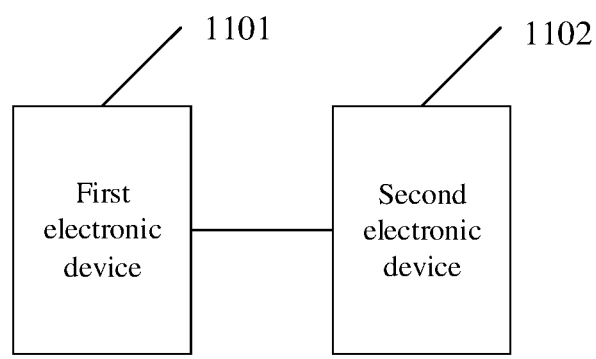
FIG. 11 is a schematic structural view of an information processing system according to an embodiment of the present application.

Exemplarily, as shown in FIG. 11, the system may include: a first electronic device 1101 and a second electronic device 1102; the first electronic device 1101 is arranged with the first functional component; the second electronic device 1102 is arranged with the second functional component.

Here, it should be noted that: the specific processing procedures of the first functional component and the second functional component have been described in detail above, and will not be repeated here.

In an exemplary embodiment, the embodiment of the present application also provides a storage medium, that is, a computer storage medium, specifically a computer-readable storage medium, for example, including a memory 1003 storing a computer program, and the above-mentioned computer program can be executed by the processor 1002 of the electronic device 1000 to complete the steps described in the foregoing method. The computer-readable storage medium may be memory such as FRAM, ROM, PROM, EPROM, EEPROM, Flash Memory, magnetic surface memory, optical disk, or CD-ROM.

It should be noted that: "first", "second", etc. are used to distinguish similar objects, and not necessarily used to describe a specific order or sequence.

In addition, the technical solutions described in the embodiments of the present application may be combined arbitrarily in a case that there is no conflict.

The above descriptions are only optional embodiments of the present application, and are not intended to limit the protection scope of the present application.

What is claimed is:

1. An information processing method based on one or more Internet of Things (IoT) devices, comprising:
  making identification of the one or more IoT devices, and detecting capabilities and/or resources that each IoT device of the one or more IoT devices is capable of providing;
  abstracting, for each IoT device of the one or more IoT devices, the each IoT device into corresponding nodes based on capabilities and/or resources of the each IoT device by software definition;
  generating a resource knowledge graph based on the nodes, wherein the nodes represent at least part of the capabilities and/or the resources of the each IoT device; an edge in the resource knowledge graph denotes relationship between the at least part of the capabilities and/or the resources of the each IoT device; and the resource knowledge graph is configured to manage and/or orchestrate available capabilities and/or resources on one or more heterogeneous IoT devices, wherein the one or more heterogeneous IoT devices comprise one or more devices whose hardware and/or software are heterogeneous;

wherein generating the resource knowledge graph based on the nodes comprises:

determining an ontology description model of each node of the nodes, and determining relationship among or between two or more of the nodes; wherein the ontology description model is at least configured to describe IoT device information and at least part of capability information and/or resource information of the IoT device corresponding to each node;

generating the resource knowledge graph based on the determined ontology description model and the relationship among or between two or more of the nodes;

wherein the method further comprises:

monitoring the one or more IoT devices;

updating, in a case that one or more changes occurred in the IoT device are monitored, the resource knowledge graph based on the monitored one or more changes of the one or more IoT devices;

wherein the monitored one or more changes of the one or more IoT devices comprise at least one of the following:

monitoring the one or more changes in computing capabilities and/or resources of the one or more IoT devices; or monitoring the one or more changes in storage capabilities and/or resources of the one or more IoT devices.

2. The method according to claim 1, wherein the monitored one or more changes of the one or more IoT devices further comprise at least one of the following:

discovering a new IoT device;

monitoring that the IoT device is disconnected from a network connection;

monitoring the one or more changes in relationship among IoT devices; or monitoring a change in the relationship between at least part of the capabilities and/or resources of the IoT device.

3. The method according to claim 1, wherein the method further comprises:

obtaining a task to be handled;

assigning, based on the resource knowledge graph, at least one node to the task to be handled, wherein the at least one node is configured to execute the task to be handled.

4. The method according to claim 3, wherein the assigning, based on the resource knowledge graph, at least one node to the task to be processed comprises:

determining a resource demand of the task to be handled;

determining, from the resource knowledge graph, at least one node matched with the resource demand, wherein the resource demand represents at least one of following resources that need to be occupied to execute the task to be handled:

a computing resource;

a storage resource;

a communication resource.

5. The method according to claim 4, wherein the determining, from the resource knowledge graph, at least one node matched with the resource demand comprises:

performing search directed to the resource demand based on the ontology description model of each node and the relationship among or between two or more of the nodes in the resource knowledge graph;

determining, based on a result of the search, at least one node matched with the resource demand.

6. An electronic device comprising: a processor and a memory configured to store a computer program executable on the processor, wherein the processor is configured to execute steps of an information processing method based on one or more Internet of Things (IoT) devices when executing the computer program, the method comprises:

making identification of the one or more IoT devices, and detecting capabilities and/or resources that each IoT device of the one or more IoT devices is capable of providing;

abstracting, for each IoT device of the one or more IoT devices, the each IoT device into corresponding nodes based on capabilities and/or resources of the each IoT device by software definition;

generating a resource knowledge graph based on the nodes, wherein the nodes represent at least part of the capabilities and/or the resources of the each IoT device; an edge in the resource knowledge graph denotes relationship between the at least part of the capabilities and/or the resources of the each IoT device; and the resource knowledge graph is configured to manage and/or orchestrate available capabilities and/or resources on one or more heterogeneous IoT devices, wherein the one or more heterogeneous IoT devices comprise one or more devices whose hardware and/or software are heterogeneous;

wherein generating the resource knowledge graph based on the nodes comprises:

determining an ontology description model of each node of the nodes, and determining relationship among or between two or more of the nodes; wherein the ontology description model is at least configured to describe IoT device information and at least part of capability information and/or resource information of the IoT device corresponding to each node;

generating the resource knowledge graph based on the determined ontology description model and the relationship among or between two or more of the nodes;

wherein the method further comprises:

monitoring the one or more IoT devices;

updating, in a case that one or more changes occurred in the IoT device are monitored, the resource knowledge graph based on the monitored one or more changes of the one or more IoT devices;

wherein the monitored one or more changes of the one or more IoT devices comprise at least one of the following:

monitoring the one or more changes in computing capabilities and/or resources of the one or more IoT devices; or monitoring the one or more changes in storage capabilities and/or resources of the one or more IoT devices.

7. A non-transitory computer-readable storage medium, on which a computer program is stored, wherein when the computer program is executed by a processor, steps of an information processing method based on one or more Internet of Things (IoT) devices are implemented by the processor, the method comprises:

making identification of the one or more IoT devices, and detecting capabilities and/or resources that each IoT device of the one or more IoT devices is capable of providing;

abstracting, for each IoT device of the one or more IoT devices, the each IoT device into corresponding nodes based on capabilities and/or resources of the each IoT device by software definition;

generating a resource knowledge graph based on the nodes, wherein the nodes represent at least part of the capabilities and/or the resources of the each IoT device; an edge in the resource knowledge graph denotes relationship between the at least part of the capabilities and/or the resources of the each IoT device; and the resource knowledge graph is configured to manage and/or orchestrate available capabilities and/or resources on one or more heterogeneous IoT devices, wherein the one or more heterogeneous IoT devices comprise one or more devices whose hardware and/or software are heterogeneous;

wherein generating the resource knowledge graph based on the nodes comprises:
  determining an ontology description model of each node of the nodes, and determining relationship among or between two or more of the nodes; wherein the ontology description model is at least configured to describe IoT device information and at least part of capability information and/or resource information of the IoT device corresponding to each node;
  generating the resource knowledge graph based on the determined ontology description model and the relationship among or between two or more of the nodes;

wherein the method further comprises:
  monitoring the one or more IoT devices;
  updating, in a case that one or more changes occurred in the IoT device are monitored, the resource knowledge graph based on the monitored one or more changes of the one or more IoT devices;

wherein the monitored one or more changes of the one or more IoT devices comprise at least one of the following:
  monitoring the one or more changes in computing capabilities and/or resources of the one or more IoT devices; or
  monitoring the one or more changes in storage capabilities and/or resources of the one or more IoT devices.

8. The electronic device according to claim 6, wherein the monitored one or more changes of the one or more IoT devices further comprise at least one of the following:
  discovering a new IoT device;
  monitoring that the IoT device is disconnected from a network connection;
  monitoring the one or more changes in relationship among IoT devices; or
  monitoring a change in the relationship between at least part of the capabilities and/or resources of the IoT device.

9. The electronic device according to claim 6, wherein when executing the computer program, the processor is configured to further execute the following:
  obtaining a task to be handled;
  assigning, based on the resource knowledge graph, at least one node to the task to be handled, wherein the at least one node is configured to execute the task to be handled.

10. The electronic device according to claim 9, wherein the assigning, based on the resource knowledge graph, at least one node to the task to be processed comprises:
  determining a resource demand of the task to be handled;
  determining, from the resource knowledge graph, at least one node matched with the resource demand, wherein the resource demand represents at least one of following resources that need to be occupied to execute the task to be handled:
  a computing resource;
  a storage resource;
  a communication resource.

11. The electronic device according to claim 10, wherein the determining, from the resource knowledge graph, at least one node matched with the resource demand comprises:
  performing search directed to the resource demand based on the ontology description model of each node and the relationship among or between two or more of the nodes in the resource knowledge graph;
  determining, based on a result of the search, at least one node matched with the resource demand.

* * * * *